Oct. 20, 1953   J. C. McCUNE   2,656,020
FRICTION ELEMENT FOR DISK BRAKES
Filed May 31, 1950
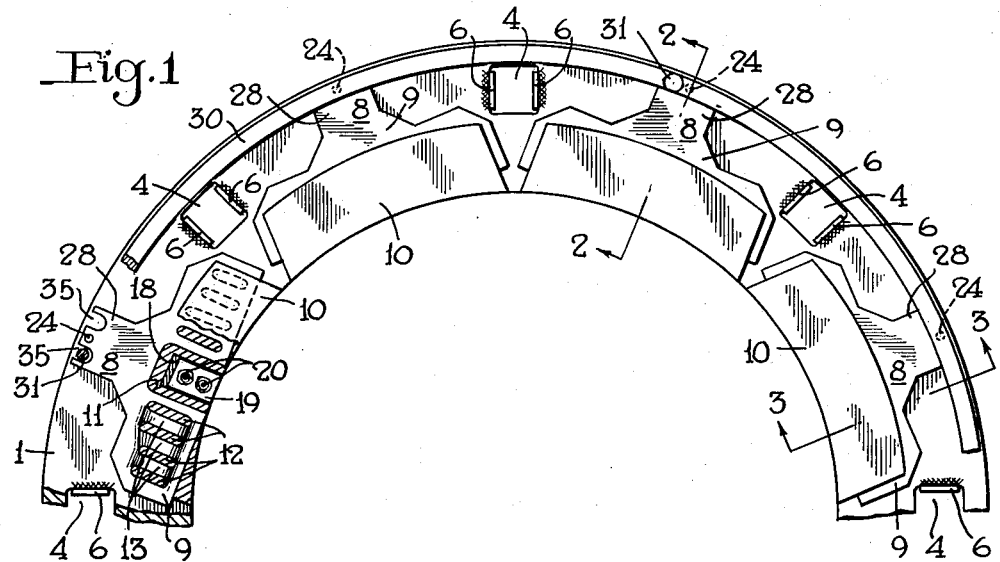
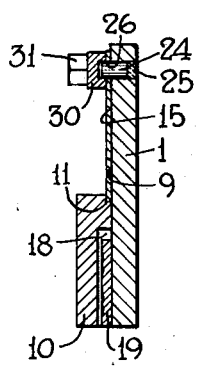
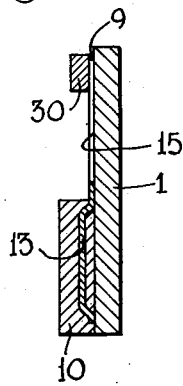
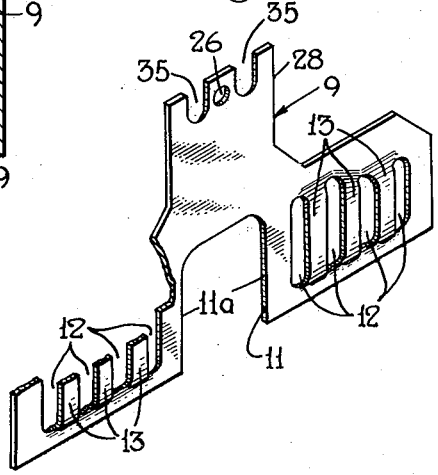
INVENTOR.
Joseph C. McCune
BY Frank E. Miller
ATTORNEY Patented Oct. 20, 1953

2,656,020

UNITED STATES PATENT OFFICE 2,656,020

FRICTION ELEMENT FOR DISK BRAKES

Joseph C. McCune, Edgewood, Pa., assignor to Westinghouse Air Brake Company, a corporation of Pennsylvania Application May 31, 1950, Serial No. 165,303

3 Claims. (Cl. 188—240)

1

This invention relates to friction elements and more particularly to those employed as stators in disc brakes.

The prime object of the present invention is to provide an improved friction element of the above type provided with friction shoes which may be replaced with ease and which will not warp or crack with heavy prolonged use.

Other objects and advantages will become apparent from the following more detailed description of the invention.

In the accompanying drawing: Fig. 1 is a face view of a segment of an annular friction element embodying the invention; Fig. 2 is a cross-sectional view taken along the line 2—2 in Fig. 1; Fig. 3 is a cross-sectional view taken along the line 3—3 in Fig. 1; and Fig. 4 is a perspective view of a backing plate comprised in the structure shown in the preceding figures.

Description

Referring to the drawing, the friction element embodying the invention comprises an annular body 1 and is adapted particularly for use as a non-rotatable braking element of a disc brake by provision of a plurality of aligned, circumferentially spaced-apart, rectangular openings 4 to accommodate the usual non-rotatable torque bars (not shown) on which the body 1 is thereby adapted to be slidably mounted. By sliding movement of the body 1 on the usual torque bars, braking engagement between the non-rotatable friction element and a rotatable friction element or elements (not shown) may be effected in the well-known manner. Braking torque forces resulting from such braking engagement will be transmitted to the non-rotatable torque bars (not shown) by respective shoulders formed by wear pads 6 welded to respective edges of openings 4. The pads 6 afford a greater bearing surface for abutment with the torque bars than the thickness of the body at openings 4 affords and protects the edges of the openings 4 from excessive wear. Termination of braking engagement is effected by slidable movement of body 1 on the torque bars (not shown) in a direction away from the rotatable braking element or elements (not shown).

The body 1 carries a plurality of circumferentially spaced apart removable brake shoe members 8. Each brake shoe member 8 comprises a backing plate 9 of sheet steel which may be formed by stamping, for example, and upon one side of which is cast a brake shoe 10 for frictional interengagement with corresponding shoes on the rotatable braking element (not shown), the opposite side of said member being flat for engagement with a flat surface 15 of body 1. Each of the backing plates 9 is provided with a shoe carrying portion having a rectangular shaped slot 11 midway between the ends of the plate and open at the inner edge of the plate (as mounted on body 1), and a plurality of spaced apart openings 12 at opposite sides of said slot which openings are elongated in the direction of the radius of the body 1 as said plate is mounted on said body. The portions or webs 13 provided between the openings 12 at each side of slots 11 are pressed out of the plane of the surrounding portion of the plate 9, in a direction away from the side of the plate adapted to engage the body 1, a distance exceeding the thickness of said plate so as to provide at the body side of each web a recess into and through which molten metal may flow via and between openings 12 during casting of the shoe 10 onto said plate, which shoe upon cooling, provides a flat surface of backing plate and shoe for mounting on the smooth plane surface 15 of the annular body 1. The webs 13 thus being surrounded by metal integral with the metal at the braking side of the plate acts to securely hold the brake shoe to said plate. In the back of each cast shoe 10 within the groove 11 is formed, preferably during casting, a rectangular slot 18 to accommodate a torque transmitting lug 19 attached by means of such as welds 20 to the face 15 at the inner peripheral edge of body 1 equidistant from adjacent openings 4. Each of the lugs 19 is preferably rectangular in shape to provide two opposite shoulders extending parallel to a radius of the body 1 for free sliding engagement with corresponding shoulders formed by the slot 18 in the shoe 10. A slight clearance between torque lugs 19 and shoes 10 exists to allow for thermal expansion of such shoes during heavy prolonged brake applications.

Each of the brake shoe members 8 is held in place radially of the annular body 1 by a retaining pin 24 rigidly attached to said body, by such as a weld 25, in radial alignment with one of the lugs 19. An opening 26 in a projecting portion 28 of each backing plate 9 is provided to accommodate the pin 24. The length of the shoe carrying portion of the backing plate is less than the distance between adjacent openings 4 so that in assembly of the shoe member 8 to the body 1, when the friction element is in position in a brake, each member may be slipped radially inward of said body between the adjacent respective torque bars (not shown) extending through the openings 4 into place on the lugs 19, and the respective opening 26 in the backing plates 9 may then be brought into registry with and slipped over the respective retaining pin 24. All shoe members 8, once positioned as above, are then held so positioned in contact with the surface 15 of the body 1 by an annular retaining ring 30 removably secured by means such as cap screws 31 to said body. The annular retaining ring 30 when in place is disposed adjacent to the outer peripheral edge of the annular body 1 in engagement with the radially outward projecting ends of each portion 28 of the backing plates 9 and covering projecting ends of the retaining pins 24; sockets being provided in said ring at the locations of pins 24 to accommodate the ends of same and aid in locating the ring prior to insertion of cap screws 31. The projecting ends of each of the portions 28 of the backing plates 9 are provided with slots 35 one at either side of the respective pin 24 and open to the outer edge of the plate through which the cap screws 31 may extend in securing the ring 30 to the body 1. The shoe members 8 easily may be removed from the body 1, for replacement, for example, by removal of the cap screws 31 and the retaining ring 30, after which said members may be freed from the pins 24 and slipped radially outward from the lugs 19 between openings 4.

It should be pointed out that during employment of the assembled friction element in a disc brake, when the shoes 10 are in frictional braking engagement with other shoes in such brake, torque forces resultant from such engagement is transmitted substantially directly from the shoes to the body 1 by way of the lugs 19 in which they are in engagement. The backing plates 9 are subjected to little if any such torque forces and act substantially exclusively as mediums through which the shoes 10 are attached to the body 1 for carriage thereby.

*Summary*

It will now be seen that I have provided an improved friction element particularly adapted for use as a non-rotatable friction braking element in a disc brake for railway use, which friction element comprises removable friction shoes which are easily replaceable and which will not crack or warp with excessive prolonged use.

Having now described my invention, what I claim as new and desire to secure by Letters Patent, is:

1. In a disc brake or the like, a friction element comprising in combination, a body having a mounting face, a torque transmitting lug attached to said body and projecting from said face, a retaining pin attached to said body and projecting from said face, a backing plate having an opening receiving said retaining pin, a friction shoe cast onto said backing plate and having a socket in engagement with said lug and slidable thereon in the direction of said pin, and removable means holding said backing plate on said pin.

2. In a disc brake or the like, a friction element comprising in combination, an annular body having a mounting face, a plurality of circumferentially spaced apart torque transmitting lugs attached to said body and projecting from said face, an equal number of circumferentially spaced apart retaining pins attached to said body and projecting from said face in radial alignment with said lugs, a plurality of backing plates each having an opening receiving a respective one of said pins, a plurality of friction shoes each cast onto a respective one of said backing plates and having a socket open at a side opposite said pin and disposed in radially slidable engagement with a respective one of said lugs, and a retaining ring removably attached to said body holding said backing plates in proximity of said face.

3. In a disc brake or the like, a friction element comprising in combination, a body having an annular mounting face and a plurality of circumferentially spaced apart axially extending torque bar accommodating openings adjacent the outer peripheral edge of said face, a plurality of circumferentially spaced apart torque transmitting lugs at the inner peripheral edge of said body spaced equidistant from said openings and projecting from said face, a plurality of backing plates removably secured in contact with said face and each having an elongated shoe mounting portion disposed at right angles to the radius of said body and of lesser longitudinal dimension than the distance between adjacent edges of said openings, and a plurality of friction shoes each cast onto a respective one of said backing plates and each having a socket abutting a respective one of said lugs and being slidable thereon radially outward of said body.

JOSEPH C. McCUNE.

References Cited in the file of this patent

UNITED STATES PATENTS

| Number | Name | Date |
|---|---|---|
| 787,079 | Collier | Apr. 11, 1905 |
| 1,054,974 | Marquart | Mar. 4, 1913 |
| 1,867,348 | Blume | July 12, 1932 |
| 2,451,326 | Eksergian et al. | Oct. 12, 1948 |
| 2,451,329 | Gaenssle | Oct. 12, 1948 |
| 2,498,501 | Newell | Feb. 21, 1950 |

FOREIGN PATENTS

| Number | Country | Date |
|---|---|---|
| 171,503 | Great Britain | Nov. 24, 1921 |